United States Patent [19]

Koger et al.

[11] 3,708,403

[45] Jan. 2, 1973

[54] SELF-ALIGNING ELECTROPLATING MASK

[76] Inventors: Terrell B. Koger, 3811 East McKellips Road, Mesa, Ariz. 85201; Lewis E. Terry, 4812 East Mitchell, Phoenix, Ariz. 85018

[22] Filed: Sept. 1, 1971

[21] Appl. No.: 176,831

[52] U.S. Cl. ..................204/15, 204/35 R, 204/37 R, 204/38 B

[51] Int. Cl. ...........C23b 5/50, C23b 5/30, C23b 5/24

[58] Field of Search ............204/15, 35 R, 37 R, 38 B

[56] References Cited

UNITED STATES PATENTS

| | | | |
|---|---|---|---|
| 3,035,990 | 5/1962 | Davis et al. | 204/33 X |
| 3,192,135 | 6/1965 | Robbins | 204/15 X |
| 3,197,391 | 7/1965 | Bowers | 204/33 |
| 3,294,653 | 12/1966 | Keller et al. | 204/38 A X |
| 3,388,048 | 6/1968 | Szabo | 204/15 |
| 3,634,204 | 1/1972 | Dhaka et al. | 204/15 |

FOREIGN PATENTS OR APPLICATIONS

| | | | |
|---|---|---|---|
| 1,007,662 | 10/1965 | Great Britain | 204/15 |

*Primary Examiner*—F. C. Edmundson
*Attorney*—Mueller & Aichele

[57] ABSTRACT

A self-aligning electroplating mask and a method of electroplating using a self-aligning mask is disclosed. A layer of metal, for example, titanium, is deposited on a substrate. On top of the titanium film is deposited a film of a second metal such as platinum. The platinum metal is etched to expose the titanium. The exposed titanium is oxidized to provide a self-aligning mask. The titanium oxide mask enables a subsequent electroplating step to deposit a metal such as gold on top of the remaining platinum film. Then the titanium oxide mask is removed.

5 Claims, 5 Drawing Figures

INVENTORS
Terrell B Koger
BY Lewis E Terry
Mueller, Aichele, & Rauner
Attys

SELF-ALIGNING ELECTROPLATING MASK

BACKGROUND OF THE INVENTION

This application is a continuation-in-part of Ser. No. 881,716, filed Dec. 3, 1969, now abandoned.

This invention relates to electroplating and more particularly to a self-aligning mask for use in electroplating.

Overlay metallization systems having two or three metal layers or films are widely used in a wide variety of semiconductor devices. These multi-layer metallization systems consist of a first metal layer deposited on the semiconductor which is capable of forming a particularly good ohmic contact with the semiconductor and capable of adhering to the passification layer without interaction, followed by the deposition of additional layers of metal to provide the best possible surface for lead attachment. Common examples of such multi-layer systems include aluminum-molybdenum-gold, titanium-platinum-gold, chromium-platinum-gold, and the like. The formation of multi-layer metallization systems including platinum and gold films has proved difficult, however, because of the resistance of these metals to chemical etching and because of the alignment limitations of the usual photoresist masking compositions which are used for selective electroplating techniques. For example, masks formed of a typical photoresist composition such as KMER are cumbersome to use as masks for electroplating primarily due to the problem of obtaining accurate alignment without taking substantial extra precautions.

It is an object of this invention to provide an improved mask for electroplating. It is another object of this invention to provide a self-aligning mask for electroplating. It is yet another object of this invention to provide a method of electroplating which involves the use of a mask that is self-aligning.

Other objects of this invention will be apparent from the following detailed description, reference being made to the accompanying drawings wherein various stages of the electroplating process using the self-aligning mask are shown.

IN THE DRAWINGS

FIGS. 1 through 5 illustrate the various stages of the semiconductor device involved in the electroplating process using the self-aligning mask.

DESCRIPTION OF THE PREFERRED EMBODIMENT

Figure 1:
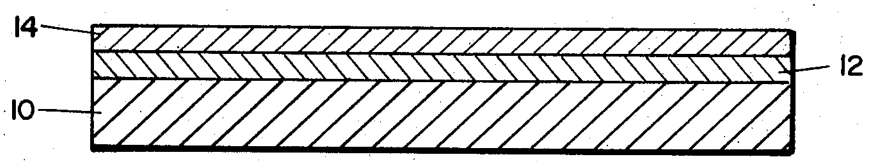

As shown in FIG. 1, the substrate 10 has a layer of metal 12 thereon. The substrate 10 is a semiconductor such as silicon or germanium, a ceramic such as alumina, berryllia, steatite, and so forth, glass, a metal such as iron, nickel, molybdenum, copper, aluminum, and so forth. Other semiconductors which may be used include, for example, gallium arsenide and other group III–IV compound semiconductors. Metal layer or film 12 is preferably titanium or chromium which forms an oxide which serves as a mask for the subsequent electro deposition of another metal. Other metals which may be used for the layer 12 include tantalum, tungsten, zirconium, hafnium, niobium, and the like. Metal layer 12 has a thickness of about 500 to 2,500 angstroms with a preferred thickness of about 1,000 angstroms. The layer 12 is formed by known methods, such as vacuum evaporation or sputtering.

On top of the metal layer 12 is a metal layer or film 14. Metal layer 14 is a metal which is an excellent conductor and one which provides a suitable base for the attachment of end leads. Metal layer 14 is preferably platinum, gold, palladium, rhodium, iridium, and the like. The thickness of layer 14 is about 500 to 5,000 angstroms and preferably 1,000 to 2,000 angstroms. Layer 14 is deposited by vacuum evaporation or sputtering.

Figure 2:
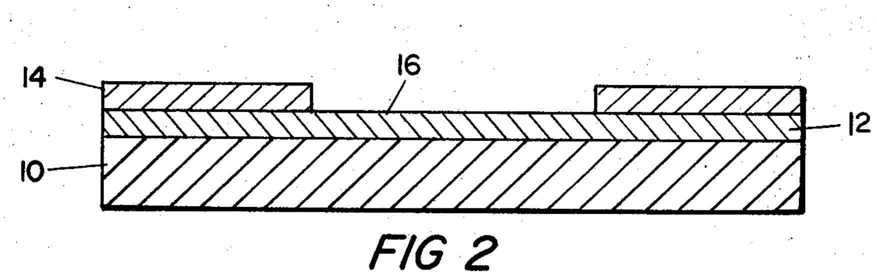

As shown in FIG. 2, metal layer 14 is selectively etched to expose a portion 16 of the metal, for example, titanium layer 12. This etching step is done by conventional methods such as applying a film of photoresist material such as KMER, exposing the film and removing unpolymerized photoresist film. The metal layer 14 is then etched by the use of an etchant such as an $HNO_3$:HCl solution.

Figure 3:
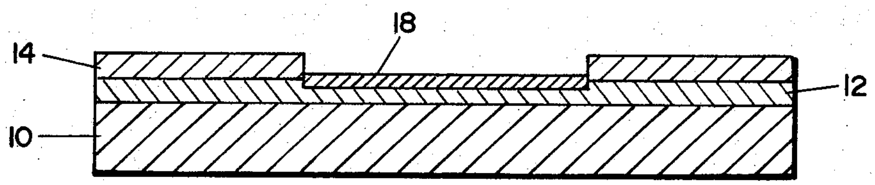

The exposed portion 16 of the titanium metal layer shown in FIG. 2 is then oxidized to form the titanium oxide region 18 shown in FIG. 3. This is accomplished by placing the substrate in an oxidizing atmosphere at an elevated temperature.

Figure 4:
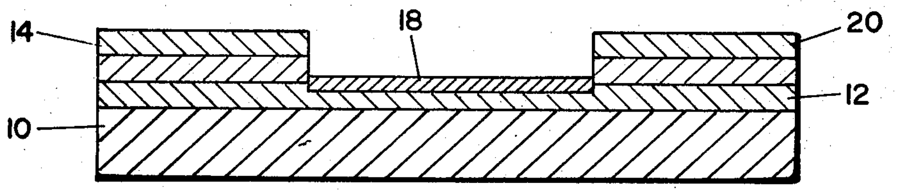
Figure 5:
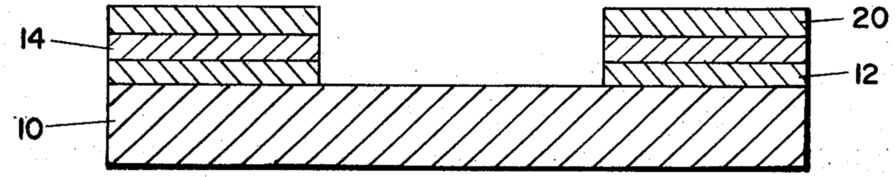

As shown in FIG. 4, a layer 20 of a metal such as gold, silver, palladium, rhodium, iridium, and the like, is electroplated onto the remaining portions of the metal film 14 to form the layer 20. This is accomplished by standard electroplating techniques. The titanium oxide portion 18 is substantially a nonconductor of electricity and hence none of the metal layer 20 will plate thereon.

The titanium portion 18 and the titanium layer 12 underlying the portion 18 is then removed by a chemical etchant such as $H_2SO_4$:HF.

EXAMPLE

A silicon wafer is etched, lapped, and polished to provide a suitable surface. A titanium layer about 2,000 angstroms thick is deposited on top of the silicon substrate. A layer of platinum having a thickness of 2,000 angstroms is deposited on top of the titanium. A layer of photoresist is then deposited on top of the platinum layer and exposed to form a selective mask. The platinum is then etched with an $HnO_3$:HCl solution. The KMER layer is removed. The substrate is then placed in an oven at a temperature of 400° C for 15 minutes to oxidize the exposed portion of the titanium layer to titanium oxide. Titanium oxide serves as a mask for a layer of gold which is electroplated on top of the platinum layer. The titanium oxide mask region and the titanium layer which was exposed by the removal of the platinum layer is then removed by a chemical etching step using an $H_2SO_4$:HF mixture as an etchant. This process which employs a self-aligning oxide mask yielded the desired metallization system in which the silicon substrate had a titanium-platinum-gold metallization system thereon.

We claim:

1. A method of electroplating one metal on a selective portion of another metal involving the use of a self-aligning mask comprising the steps of:

providing a substrate having an upper surface;

depositing a film on said upper surface of a first metal taken from the group consisting of titanium, zirconium, tantalum, tungsten, chromium, niobium, and hafnium;

depositing on said first metal film a film of a second metal taken from the group consisting of platinum, gold, and silver;

removing a portion of said second metal film for exposing a portion of said first metal film;

forming from said first metal layer an oxide of said metal on said exposed portions of said first metal layer by baking said exposed first metal layer in an oxidizing atmosphere at an elevated temperature; and electroplating a layer of a third metal on the remaining portion of said second metal layer.

2. A method as described in claim 1 whereby said oxide is formed by baking said substrate in air at an elevated temperature.

3. A method as described in claim 1 including the step of etching said metal oxide film and said first metal underneath said metal oxide film.

4. A method as described in claim 1 whereby said first metal film is deposited on a silicon substrate.

5. A method of electroplating one metal on a selective portion of another metal involving the use of a self-aligning mask, comprising the steps of:

providing a silicon substrate having an upper surface;

depositing a film of titanium on said upper surface of said silicon substrate;

depositing a film of platinum on said titanium film;

removing a portion of said platinum film to expose a portion of said titanium layer;

oxidizing said exposed titanium portion to form an oxide film by baking said exposed titanium in air at an elevated temperature;

electroplating a film of gold on the remaining portion of said platinum film; and removing said titanium oxide film and said titanium film underlying said titanium oxide film.

* * * * *